May 13, 1969  J. H. GEE  3,443,526
STABILIZING MECHANISM FOR CARRIER IN CONVEYOR SYSTEM
Filed March 9, 1967
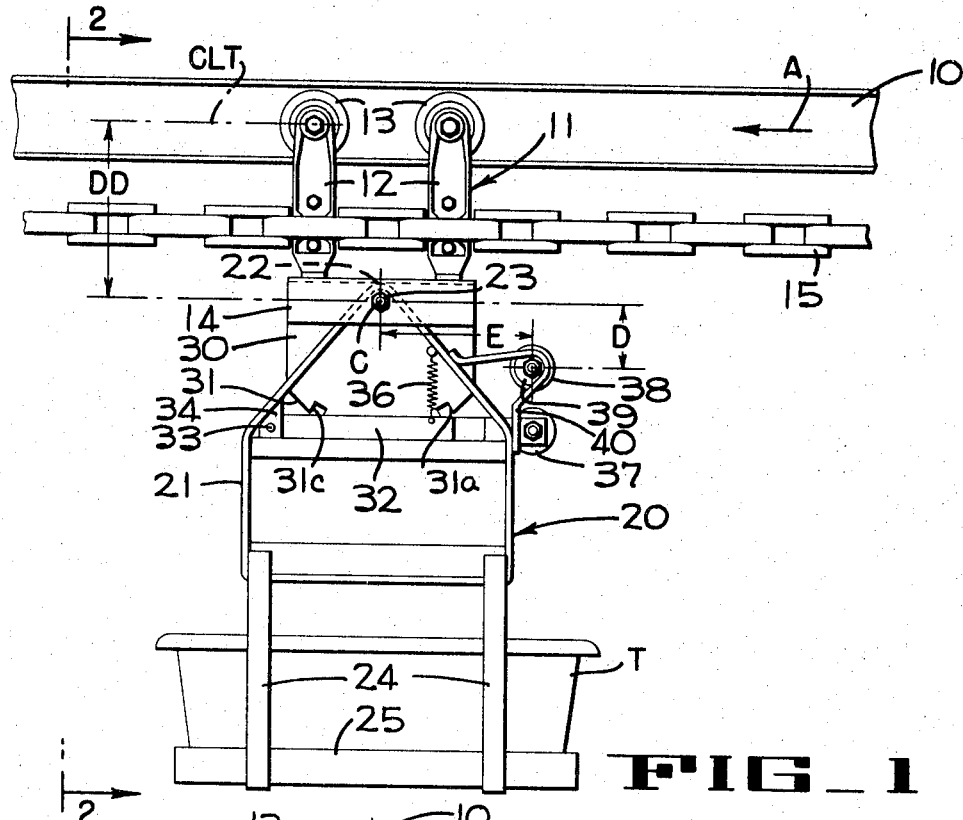
FIG_1
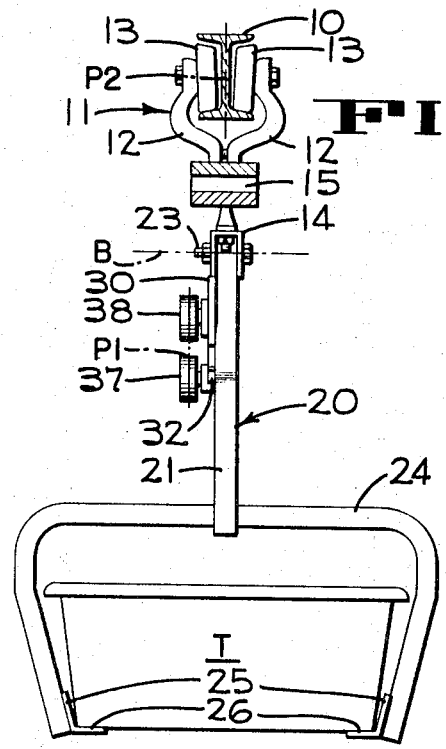
FIG_2
INVENTOR.
JAMES H. GEE
BY
Francis W. Anderson
ATTORNEY May 13, 1969 J. H. GEE 3,443,526
STABILIZING MECHANISM FOR CARRIER IN CONVEYOR SYSTEM
Filed March 9, 1967 Sheet 2 of 4
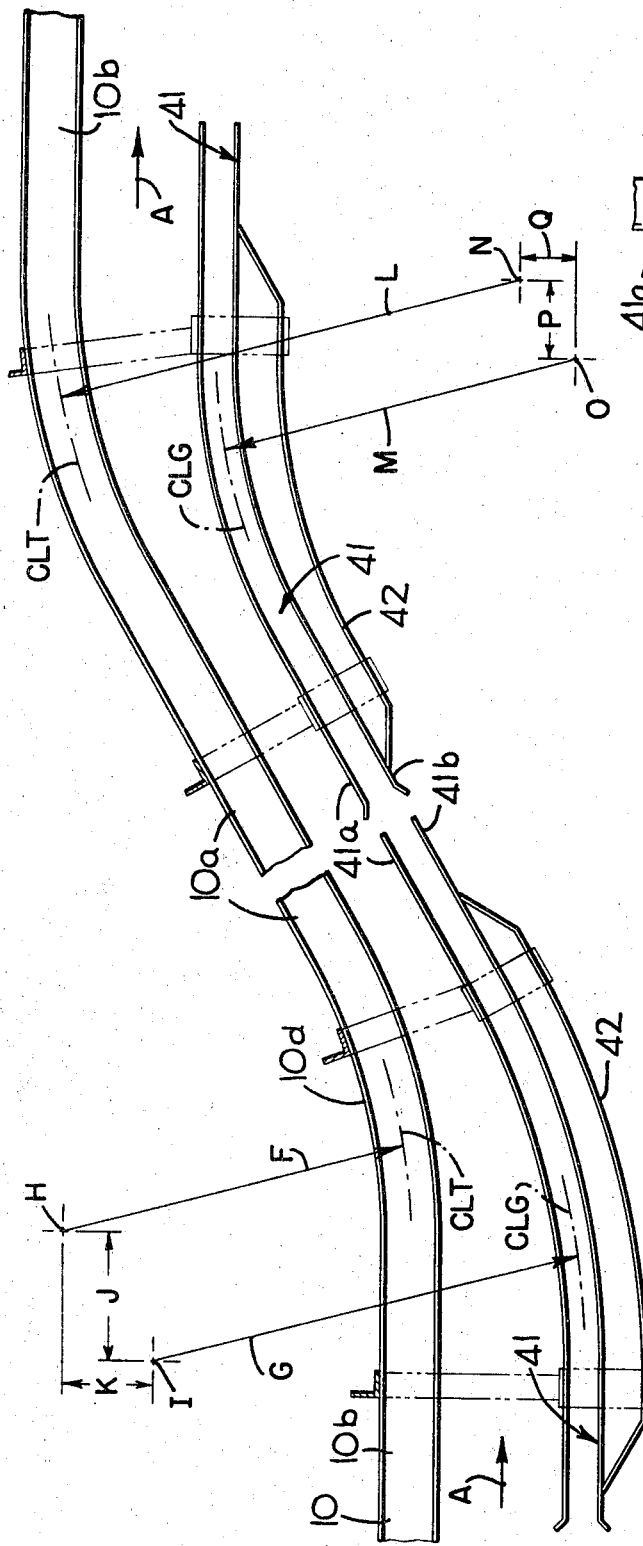
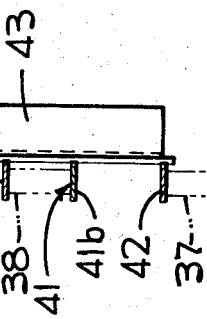
INVENTOR.
JAMES H. GEE
BY Francis W. Anderson
ATTORNEY

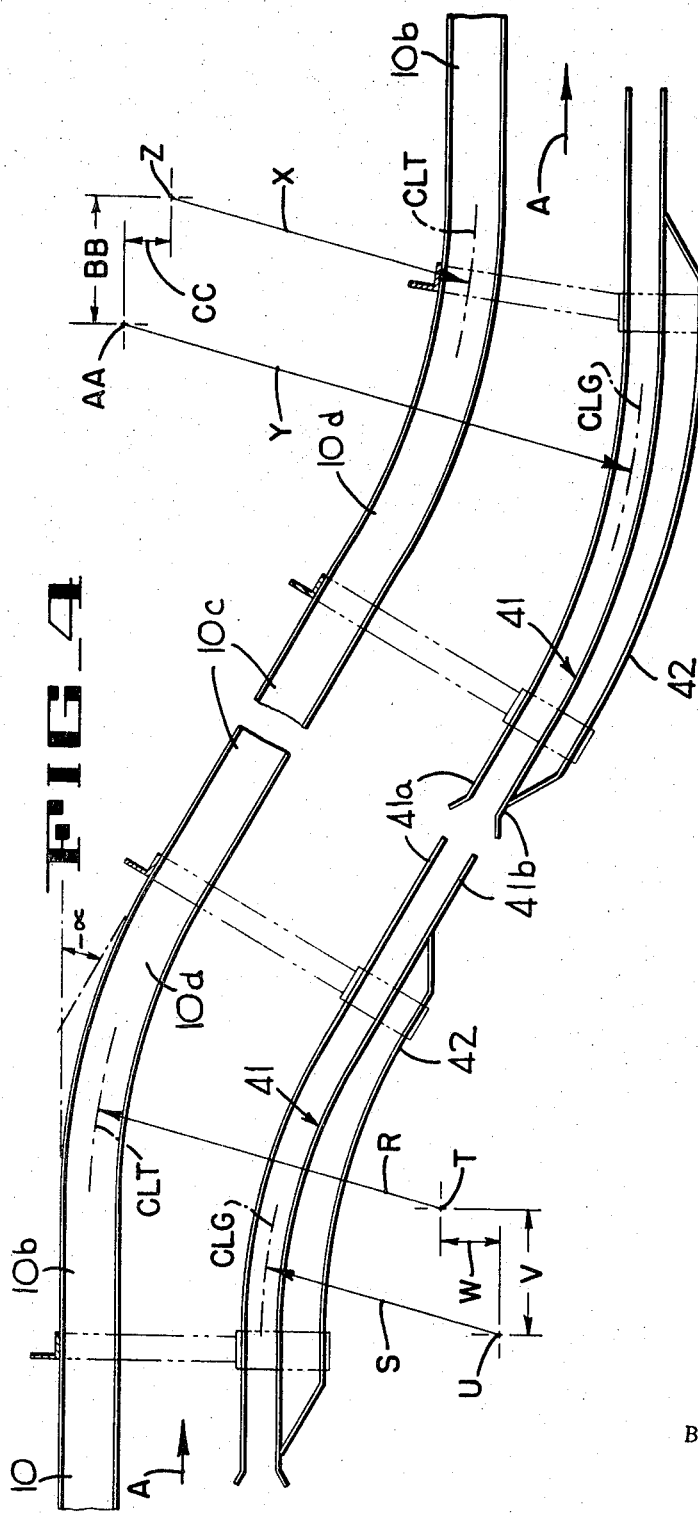

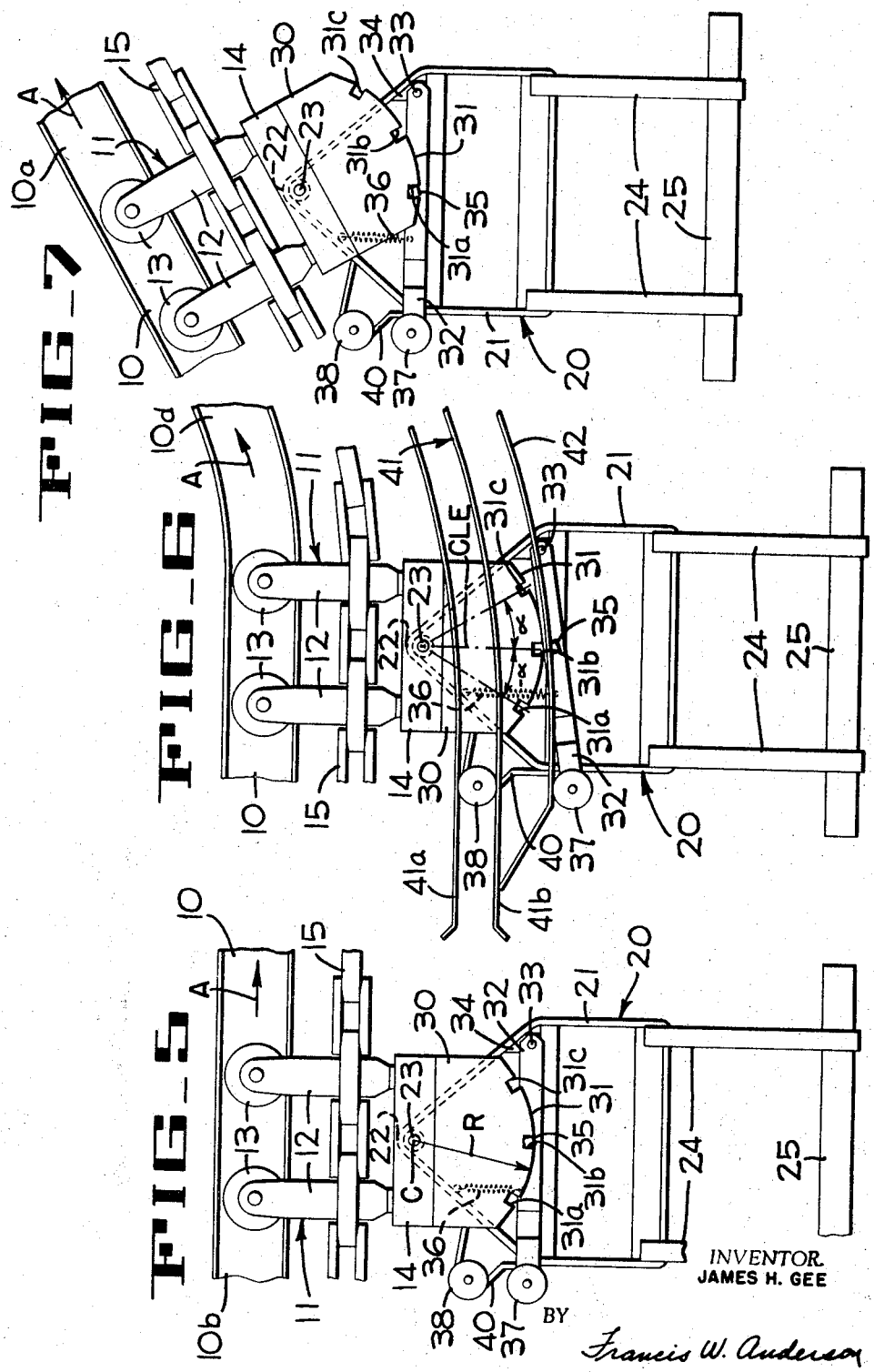

United States Patent Office 3,443,526
Patented May 13, 1969

3,443,526
STABILIZING MECHANISM FOR CARRIER IN CONVEYOR SYSTEM
James H. Gee, San Jose, Calif., assignor to FMC Corporation, San Jose, Calif., a corporation of Delaware
Filed Mar. 9, 1967, Ser. No. 621,853
Int. Cl. B61j *1/06;* B61b *3/00;* E01b *25/22*
U.S. Cl. 104—96    17 Claims

ABSTRACT OF THE DISCLOSURE

A carrier in a conveyor system which has horizontal and inclined sections of track is held level at all times. A chain driven trolley rides on the track and is oriented according to the orientation of the track. A carrier is pivotally suspended from the trolley and guide members hold the carrier level as the trolley orientation changes. A pivotal latch on the carrier is urged into engagement with a notched plate secured to the trolley to lock the carrier in different positions relative to the trolley, holding the carrier level with different orientations of the trolley. Cam members at each end of inclined track sections unlock the latch of a passing carrier.

---

The present invention relates to a conveyor system having inclined sections of track.

In some conveyor systems having inclined sections of track, the carrier which receives the load is secured rigidly to the trolley which rides on the track. With the carrier rigidly secured to the trolley, the carrier will not sway on the trolley. However, the trolley assumes the same orientation as the track and, with this arrangement, the carrier will also assume the same orientation as the track. In other words, the load bearing carrier will be horizontal, or level, as the trolley traverses horizontal sections of track, but will be canted when the trolley rides on the inclined sections of track.

In some conveyor systems, the carrier is pivotally suspended from the trolley so that the carrier, if carrying a balanced load, will tend to swing to a level position. However, the free swinging carrier will sway to and fro, and there is always the danger of the load shifting on the carrier or sliding off the carrier.

In the apparatus of the present invention, the carrier is always prevented from swaying to and fro (that is, in the direction of travel) and always remains level, even when the trolley traverses an inclined track section. In brief, in the preferred form of the invention, the carrier is pivotally suspended from a point on the trolley. A roller is fixed to the carrier in a position longitudinally spaced from the suspension point. A guide comprising upper and lower guide surfaces extends along the track, the guide surfaces receiving the roller therebetween. The guide is positioned with respect to the track to hold the carrier level even though the trolley is not level.

Preferably, a latch is pivotally mounted on the carrier and is urged into engagement with a notched plate secured to the trolley. The latch and notched plate define a lock which prevents the carrier from swaying to and fro relative to the trolley whenever the latch is engaged with the notched plate. The lock, which holds the carrier in a selected predetermined attitude with respect to the trolley, will stabilize the carrier without the need of guides on stretches of straight or inclined track where the orientation of the trolley is not changing. As a moving trolley changes orientation (that is, as it enters or leaves an inclined track section), a cam track adjacent the path of the carrier engages a roller on the latch to release the lock. At the same time, the roller on the carrier engages the guide adjacent the path of the carrier to stabilize the carrier, until the latch engages another notch on the notched plate. Thus, at all time, the carrier is either locked to the trolley or is stabilized by the guide tracks.

It is, therefore, one object of the present invention to maintain the carrier in a conveyor system always level without to and fro swaying. It is another object of the present invention to lock the carrier to the trolley in a conveyor system in a selected position. It is yet another object of the present invention to lock the carrier to the trolley in a conveyor system in different selected positions to maintain the carrier level regardless of the orientation of the trolley. It is still another object of the present invention to maintain control over a suspended carrier in a conveyor system at all times.

In the drawings:

FIGURE 1 is a side view in elevation of a carrier in a conveyor system incorporating the present invention;

FIGURE 2 is an end view of the carrier, taken on the line 2—2 of FIGURE 1;

FIGURE 3 shows a section of track for the carrier trolley inclined upwardly (in the direction of travel), and the cam and guide tracks therefor;

FIGURE 4 shows a section of track for the carrier trolley inclined downwardly (in the direction of travel), and the cam and guide tracks therefor;

FIGURES 5, 6 and 7 show the carrier with the carrier trolley on a level section of track; the carrier with the carrier trolley approaching an inclined section of track, and the carrier with the carrier trolley on the inclined section of track, respectively, and FIGURE 8 is a view taken on the line 8—8 of FIGURE 3.

The conveyor system shown in the drawings has a track, indicated generally at 10, which is defined by an I-beam monorail. A trolley, indicated generally at 11, has a pair of hangers 12 spaced longitudinally (that is, in the direction of travel of the carrier along the track). Each hanger 12 is split to straddle the monorail 10, and each hanger terminates in a pair of rollers 13 which ride on the upper surface of the lower flange of monorail 10. A U-shaped channel member 14 is connected to the lower ends of the hangers 12. A drive chain 15 is engaged with the hangers 12 to move the trolley along the track 10 in the directional sense indicated by the arrow A.

A carrier, indicated generally at 20, has a strap frame 21 which peaks toward an upper apex 22. The apex 22 of the frame is received over a pivot pin 23 which extends between the skirts of channel member 14. At the lower end of the frame 21 are secured a pair of inverted U-shaped arms 24 which are connected at their lower ends by longitudinally extending stringers 25. The stringers 25 have horizontal flanges 26 which define a load bearing surface to receive articles, such as tote box T, which are to be transported by the carrier. It should be noted that the use of a strap received on a pin, with only small clearance between the strap and the depending skirts of channel member 14, minimizes lateral swaying of the carrier.

A plate 30 is secured to the channel member 14 of trolley 11. The plate has a circular lower edge 31 with a radius R and a center C in the pivot axis B defined by pin 23 (see FIGURE 5). The lower edge 31 of plate 30 has three angularly spaced notches 31a, 31b and 31c therein. A latch 32 is pivotally connected at one end, as indicated at 33, to a bracket 34 secured to the carrier frame 21. The latch 32 has a latch pin 35 (of square cross section) and is normally urged upwardly by spring 36 which is connected between the latch 32 and the plate 30. The latch 32, at the end opposite pivot connection 33, has a roller 37 rotatably mounted thereon. A similar roller 38 is journaled in the block 39 which is secured by strap 40 to the upper peak portion of carrier frame 21.

The latch 32 connected to the carrier, and the notched member, or plate 30 connected to the trolley, define a releasable lock by which the carrier can be locked to the trolley and held at a fixed attitude with respect to the trolley. When the trolley 11 is traversing a horizontal section of track 10b, as shown in FIGURE 5, the spring 36 will urge the latch 32 upwardly to hold the pin 35 in notch 31b, thereby locking the carrier to the trolley. Locking the carrier to the trolley prevents any to and fro swinging of the carrier (that is, swinging in the longtudinal direction) while the trolley is traversing the horizontal section 10b of track since the trolley, which has longitudinally spaced rollers engaged with the trolley track, does not sway in the longitudinal direction.

As shown in FIGURES 3 and 4, the track 10 has horizontal sections 10b at different levels and has inclined sections 10a and 10c connecting the horizontal sections. Adjacent the bottom and the top of the inclined sections there are a guide 41 and a cam track 42. The guide 41 has an upper guide track, or guide surface, 41a and a lower guide track, or guide surface, 41b. The track 10, guide 41, and cam track 42 are connected to stationary support members, indicated at 43.

As a trolley 11 and carrier 20, which are traversing a horizontal section of track 10b, approach an arcuate track section 10d, which is located between the horizontal section 10b and inclined section 10a, as shown in FIGURE 6, the roller 38 secured to the carrier enters between the guide surfaces 41a and 41b. Guide tracks 41a, 41b define a guide and the roller 38 on the carrier defines a guide follower which is spaced longitudinally from the pivot axis B where the carrier is suspended from the trolley. The guide tracks, or surfaces, 41a and 41b thus serve to stabilize the carrier and maintain it in an always level position with the load bearing surface 26 thereof horizontal. Shortly after the roller 38 enters guide 41, roller 37 on the latch 32 engages the cam track 42 and latch 32 is swung downwardly. Thus, cam track 42 defines a cam and the roller 37 on the latch carried by the carrier defines a cam follower which is actuated by the cam to disengage pin 35 from the notch 31b, thereby unlocking the carrier from the trolley.

As the trolley and carrier start up the incline, the carrier, which is held level by the roller 38 riding in guide 41, swings relative to the trolley 11, since the trolley assumes the same orientation as the trolley track 10. After the trolley has left arcuate track section 10d and entered the inclined section of track 10a, the roller 37 leaves the cam track 42, and the latch 32 swings upwardly again. As the latch 32 swings up, the pin 35 enters notch 31a in the lower edge 31 if the plate 30 to relock the carrier 20 to the trolley 11.

All of the inclined sections 10a and 10c of the track are inclined at a predetermined angle α (say 30°) to the horizontal, and notch 31a will be at the same angle α (30°) from notch 31b with respect to the centerline CLE which passes through pivot axis B (on which center C lies) and central notch 31b of circular edge 31. The angles of the downwardly sloping inclines 10c in the direction of travel (as indicated by arrow A) are equal to but opposite to the angles of the upwardly sloping inclines and are indicated in FIGURE 4 as —α.

As the trolley and carrier traverse an arcuate track portion 10d in moving into or out of a downwardly sloping incline, the carrier will be guided by guide 41 in the same manner as when entering an upwardly sloping incline. When the carrier has fully entered a downwardly sloping incline 10c, the pin 35 on latch 32 will be engaged with notch 31c, which is at an angle of —α from centerline CLE as measured from pivot axis B, to lock the carrier to the trolley in the same manner as when the trolley has fully entered an upwardly sloping incline.

Thus, it will be seen that the guide 41 is utilized to stabilize the carrier when the angle of inclination, or orientation, of the trolley is changing (such as when the trolley traverses arcuate track section 10d) and that the lock is used when the angle of inclination, or orientation, of the trolley is constant (such as when the trolley traverses the straight track sections 10a, 10b, 10c). It should be noted, however, that the guide 41 can be utilized to stabilize the carrier even though the orientation of the trolley is not changing. This can be done by providing straight guides parallel to straight sections of the trolley track. Straight guides parallel to the trolley track might be used, for example, if the distance between arcuate sections 10d of trolley track is small.

At arcuate sections of track 10d, however, the guide 41 is not straight nor is it parallel to the trolley track 10. At any given point, the guide 41 is positioned relative to the trolley track 10 so that the carrier 20, suspended from the trolley at a pivot axis B and having a guide roller 38 spaced longitudinally from the pivot axis, will be level when the guide roller 38 is in the guide 41 between the tracks, or guide surfaces, 41a and 41b thereof.

Preferably, the horizontal sections 10b of trolley track are connected, respectively, to the inclined sections 10a, 10b of trolley track by an arcuate trolley track portion 10d defining a circular arc in a vertical plane. With this trolley track configuration, the guide will also have an arcuate portion defining a circular arc in a vertical plane. The spacing between the vertical plane P1 of the guide and the vertical plane P2 of the trolley track (see FIGURE 2) will depend on the lateral spacing between the trolley wheels and the roller 38. Without regard to this spacing, however, the arcuate guide section will have a different center and a different radius in elevation (as viewed in FIGURES 3 and 4) than the arcuate trolley track section. The relationship between the two arcuate tracks (10 and 41) can best be illustrated by a specific example of a system in which the carrier is suspended from the trolley at a point C spaced a distance DD (FIGURE 1) which is 9½ inches below the centerline CLT of the trolley track. The center of the guide roller 38 is 3⅝ inches (span D, FIGURE 1) below the pivot point C and 8⅞ inches (span E, FIGURE 1) behind, or upstream from, the pivot point C (with respect to the directional sense of travel of the carrier). In this system, arcuate guide sections are positioned relative to the arcuate trolley track sections 10d as follows (dimensions to centerline of guide track CLG and centerline of trolley track CLT):

|  | Trolley track | Guide |
|---|---|---|
| Bottom of upward incline: | | |
| Radius (F, G) | 8 feet | 9 feet 10 inches. |
| Longitudinal position of center (H, I). | Downstream | Upstream. |
| Longitudinal spacing between centers (J). | | 1 foot ¼ inches |
| Vertical position of center (H, I). | Above | Below. |
| Vertical spacing between centers (K). | | 8¼ inches |
| Top of upward incline: | | |
| Radius (L, M) | 8 feet | 8 feet 4 inches. |
| Longitudinal position of center (N, O). | Downstream | Upstream. |
| Longitudinal spacing between centers (P). | | 5¼ inches |
| Vertical position of center (N, O). | Above | Below. |
| Vertical spacing between centers (Q). | | 17¼ inches |
| Top of downward incline: | | |
| Radius (R, S) | 8 feet | 7 feet 9½ inches. |
| Longitudinal position of center (T, U). | Downstream | Upstream. |
| Longitudinal spacing between centers (V). | | 8 inches |
| Vertical position of center (T, V). | Above | Below. |
| Vertical spacing between centers (W). | | 11 inches |
| Bottom of downward incline: | | |
| Radius (X, ) | 8 feet | 9 feet 7¼ inches. |
| Longitudinal position of center (Z, AA). | Downstream | Upstream. |
| Longitudinal spacing between centers (BB). | | 9¼ inches |
| Vertical position of center (Z, AA). | Below | Above. |
| Vertical spacing between centers (CC). | | 6¼ inches |

Thus it will be seen that when the trolley has fully entred a straight section of trolley track, either a horizontal section 10b or an inclined section (either inclined upwardly 10a or downwardly 10c), the carrier is locked in a level position to the trolley and is thereby prevented from swaying. Whenever the trolley is entering or leaving an inclined track section, the carrier is stabilized and held level by the guide tracks 41a and 41b. Thus, at all times, the carrier 20 is held steady, under the positive control of the lock or guide, and is maintained with its load bearing surface 26 in horizontal position.

Having completed a detailed description of the invention so that those skilled in the art could practice the same, I claim:

1. In a conveyor system
   (a) a track having a section inclined at a particular angle to the horizontal,
   (b) a trolley mounted on the track,
   (c) a carrier pivotally suspended from the trolley, and
   (d) a releasable lock to hold the carrier in a position inclined at said particular angle relative to the trolley to hold the carrier in a level position as the trolley traverses the inclined section of track.

2. In a conveyor system
   (a) an overhead track having horizontal track sections at two different levels, said track having upwardly and downwardly inclined sections joining said horizontal sections, said upwardly inclined sections inclined with respect to the horizontal at a given angle and said downwardly inclined sections inclined with respect to the horizontal at angles equal but opposite to said given angle,
   (b) a trolley mounted on the track,
   (c) a carrier pivotally suspended from the trolley for movement along a path below said track, said carrier having a load bearing surface lying in a horizontal plane when the trolley traverses a horizontal track section and the carrier is in a predetermined position with respect to the trolley, and
   (d) a lock selectively to hold the carrier in said predetermined position with respect to the trolley as the trolley traverses said horizontal track sections, to hold the carrier in a position inclined at said given angle from said predetermined position with respect to the trolley as the trolley traverses said upwardly inclined track sections, and to hold the carrier in a position inclined at an angle equal but opposite to said given angle from said predetermined position with respect to the trolley as the trolley traverses said downwardly inclined track sections.

3. In a conveyer system, an overhead track having horizontal sections and inclined sections, a movable trolley mounted on the track, a movable carrier pivotally mounted on the trolley for movement therewith, one of said movable members having a latch thereon and the other having a notched member thereon, said latch and notched member defining a lock to hold the carrier in selected positions relative to the trolley, and means adjacent the track to actuate said lock as the trolley moves from said horizontal sections to said inclined sections and from said inclined sections to said horizontal sections.

4. The mechanism of claim 1 including a guide extending along the track to maintain the carrier level when the lock is released.

5. The mechanism of claim 1 including means to release said lock as the trolley moves onto and off said inclined section.

6. In a conveyor system
   (a) a track having a horizontal section and an inclined section,
   (b) a trolley mounted on the track,
   (c) a carrier suspended from the trolley and pivotal with respect thereto to remain in the same load-carrying level attitude when the trolley traverses the horizontal and inclined track sections, said carrier having a guide follower fixed thereto in spaced relation to the track when the carrier is in said load-carrying level attitude, and
   (d) a guide extending along the track in spaced relation to the track for engagement by the guide follower, said guide positioned with respect to the track to hold the pivotally suspended carrier in said load-carrying level attitude.

7. In a conveyor system
   (a) a track having a horizontal section, an inclined section, and an arcuate section joining the horizontal and inclined sections,
   (b) a trolley mounted on the track for travel longitudinally thereon,
   (c) a carrier pivotally suspended at a point from the trolley, said carrier having a load bearing surface and having a roller fixed to the carrier spaced longitudinally from said point, said roller spaced from the track as the trolley travels on any section of track, and
   (d) a guide extending along the track, said guide having vertically spaced guide surfaces for receipt of the roller there between, said guide spaced from the track to hold the carrier in a fixed attitude with the load bearing surface thereof horizontal.

8. In a conveyor system
   (a) an overhead track having horizontal track sections at two different levels, said track having inclined sections joining said horizontal sections, some of said inclined sections inclined with respect to the horizontal at a given angle and other of said inclined sections inclined with respect to the horizontal at angles equal but opposite to said given angle,
   (b) a trolley mounted on the track,
   (c) a carrier pivotally suspended from the trolley for movement along a path below said track, said carrier having a load bearing surface lying in a horizontal plane when the trolley traverses a horizontal track section and the carrier is in a predetermined position with respect to the trolley,
   (d) a lock selectively to hold the carrier in said predetermined position with respect to the trolley, in a position inclined at said given angle from said predetermined position with respect to the trolley, and in a position inclined at an angle equal but opposite to said given angle from said predetermined position with respect to the trolley, and
   (e) means to release the lock as said trolley moves from a horizontal track section to an inclined track section and as said trolley moves from an inclined track section to a horizontal track section.

9. In a conveyor system, an overhead track having inclined sections, a movable trolley mounted on the track, a movable carrier pivotally mounted on the trolley for movement therewith, one of said movable members having a latch thereon and the other having a notched member thereon, said latch and notched member defining a lock to hold the carrier in selected positions relative to the trolley, a roller on the latch, and a cam track adjacent the inclined section of track to receive the roller and disengage the latch from the notched member as the trolley and carrier pass.

10. In a conveyor system, an overhead track having inclined sections, a movable trolley mounted on the track, a movable carrier pivotally mounted on the trolley for movement therewith, a latch pivotally connected to the carrier, a notch plate fixed to the trolley, said latch and notched plate defining a lock to hold the carrier in selected positions relative to the trolley.

11. In a conveyor system
   (a) an overhead track having horizontal track sections at two different levels, said track having inclined sections joining said horizontal sections, some of said inclined sections inclined with respect to the horizontal at a given angle and other of said inclined sections inclined with respect to the horizontal at angles equal but opposite to said given angle, (b) a trolley mounted on the track, (c) a carrier pivotally suspended from the trolley for movement along a path below said track, said carrier having a load bearing surface lying in a horizontal plane when the trolley traverses a horizontal track section and the carrier is in a predetermined position with respect to the trolley, (d) a lock selectively to hold the carrier in said predetermined position with respect to the trolley, in a position inclined at said given angle from said predetermined position with respect to the trolley, and in a position inclined at an angle equal but opposite to said given angle from said predetermined position with respect to the trolley, (e) means to release the lock as said trolley moves from a horizontal track section to an inclined track section and as said trolley moves from an inclined track section to a horizontal track section, (f) a roller mounted on the carrier, and (g) guide tracks extending along said path to receive the roller and stabilize the carrier to maintain the load bearing surface thereof level when the lock is released.

12. In a conveyor system, an overhead track having inclined sections, a movable trolley mounted on the track, a movable carrier pivotally mounted on the trolley for movement therewith, one of said movable members having a latch thereon and the other having a notched member thereon, said latch and notched member defining a lock to hold the carrier in selected positions relative to the trolley, a roller on the latch, a cam track adjacent the inclined section of track to receive the latch roller and disengage the latch from the notched member as the trolley and carrier pass, a roller on the carrier, and guide tracks adjacent the inclined section of track to receive said carrier roller and stabilize the carrier when the latch is disengaged from the notched member.

13. In a conveyor system, an overhead track having inclined sections, a movable trolley mounted on the track, a movable carrier pivotally mounted on the trolley for movement therewith, one of said movable members having a latch thereon and the other having a notched member thereon, said latch and notched member defining a lock to hold the carrier in selected positions relative to the trolley, a roller on the latch, a cam track adjacent the inclined section of track to receive the latch roller and disengage the latch from the notched member as the trolley and carrier pass, a roller on the carrier, and guide tracks adjacent the inclined section of track to receive said carrier roller and stabilize the carrier when the latch is disengaged from the notched member, said cam track and guide tracks positioned at each end of the inclined track section for unlatching and stabilizing the carrier as the carrier enters and leaves the inclined track section.

14. In a conveyor system having a trolley track, (a) a trolley mounted on the trolley track, (b) a carrier pivotally connected to the trolley at a pivot axis, (c) a plate mounted on the trolley having a circular edge with a center in said pivot axis, said circular edge having a plurality of notches therein, (d) a latch pivotally mounted on the carrier for engagement with one of said notches, (e) a cam track adjacent said trolley track to cam the latch out of engagement with said plate, and (f) a guide track adjacent said trolley track to stabilize the carrier when the latch arm is disengaged from said plate.

15. In a conveyor system (a) an overhead track having horizontal track sections at two different levels, said track having inclined sections joining said horizontal sections, some of said inclined sections inclined with respect to the horizontal at a given angle and other of said inclined sections inclined with respect to the horizontal at angles equal but opposite to said given angle, (b) a trolley mounted on the track, (c) a carrier pivotally suspended from the trolley for movement along a path below said track, said carrier having a load bearing surface lying in a horizontal plane when the trolley traverses a horizontal track section and the carrier is in a predetermined position with respect to the trolley, (d) a lock selectively to hold the carrier in said predetermined position with respect to the trolley, in a position inclined at said given angle from said predetermined position with respect to the trolley, and in a position inclined at an angle equal but opposite to said given angle from said predetermined position with respect to the trolley, (e) means to release the lock as said trolley moves from a horizontal track section to an inclined track section and as said trolley moves from an inclined track section to a horizontal track section, and (f) a guide to stabilize the carrier against swaying and to maintain the load bearing surface thereof level when the lock is released.

16. In a conveyor system (a) an overhead track having horizontal track sections at two different levels, said track having inclined sections joining said horizontal sections, some of said inclined sections inclined with respect to the horizontal at a given angle and other of said inclined sections inclined with respect to the horizontal at angles equal but opposite to said give angle, (b) a trolley mounted on the track, (c) a carrier pivotally suspended from the trolley for movement along a path below said track, said carrier having a load bearing surface lying in a horizontal plane when the trolley traverses a horizontal track section and the carrier is in a predetermined position with respect to the trolley, (d) a lock selectively to hold the carrier in said predetermined position with respect to the trolley, in a position inclined at said given angle from said predetermined position with respect to the trolley, and in a position inclined at an angle equal but opposite to said given angle from said predetermined position with respect to the trolley, (e) means to release the lock as said trolley moves from a horizontal track section to an inclined track section and as said trolley moves from an inclined track section to a horizontal track section, said means including a cam along the path of the carrier adjacent an inclined section of track, and a cam follower on the carrier operable when engaged with said cam to release the lock.

17. In a conveyor system (a) an overhead track having horizontal track sections at two different levels and having inclined sections joining said horizontal sections, (b) a trolley mounted on the track, (c) a carrier suspended from the trolley for movement along a path below said track, said carrier having a load bearing surface lying in a horizontal plane when the trolley traverses a horizontal track section, said carrier pivotal on the trolley to swing with respect to the trolley as the trolley passes from a horizontal section to an inclined section and from an inclined section to a horizontal section to maintain said load bearing surface in a horizontal plane, (d) a lock selectively to hold and release the carrier with respect to the trolley, said lock effective when operated to hold the carrier fixed with respect to the trolley as the trolley traverses horizontal and inclined sections of track and to release the carrier for pivotal movement with respect to the trolley as the trolley

9 passes from horizontal to inclined track sections and from inclined to horizontal track sections, and (e) means to operate said lock as the trolley passes from horizontal to inclined track sections and from inclined to horizontal track sections.

References Cited

UNITED STATES PATENTS 1,052,672    2/1913    Ley _____ 105—242

10

2,336,551    12/1943    Kumler _____ 214—60
3,115,846    12/1963    Dehne _____ 104—172

ARTHUR L. LA POINT, *Primary Examiner.*

DANIEL F. WORTH III, *Assistant Examiner.*

U.S. Cl. X.R.

104—172